(12) United States Patent
Kuckhoff et al.

(10) Patent No.: US 11,603,887 B2
(45) Date of Patent: Mar. 14, 2023

(54) COUPLING

(71) Applicant: Dodge Industrial, Inc., Oxford, CT (US)

(72) Inventors: Thomas E. Kuckhoff, Greenville, SC (US); Theodore Hazlett, Greenville, SC (US)

(73) Assignee: Dodge Industrial, Inc., Oxford, CT (US)

( * ) Notice: Subject to any disclaimer, the term of this patent is extended or adjusted under 35 U.S.C. 154(b) by 0 days.

(21) Appl. No.: 17/375,683

(22) Filed: Jul. 14, 2021

(65) Prior Publication Data

US 2023/0016830 A1     Jan. 19, 2023

(51) Int. Cl.
*F16D 1/033*     (2006.01)
(52) U.S. Cl.
CPC .................................. *F16D 1/033* (2013.01)
(58) Field of Classification Search
CPC ................................ F16D 1/033; F16D 1/076
USPC ......................................................... 403/337
See application file for complete search history.

(56) References Cited

U.S. PATENT DOCUMENTS

| 4,413,980 | A | | 11/1983 | Walloch |
| 4,893,962 | A | * | 1/1990 | Komeyama ............... F16D 3/40 464/130 |
| 5,019,015 | A | * | 5/1991 | Wasserfuhr ........... F16B 37/145 464/99 |
| 2020/0011382 | A1 | | 1/2020 | Burdeshaw et al. |

* cited by examiner

*Primary Examiner* — Lindsay M Low
*Assistant Examiner* — Omar Morales
(74) *Attorney, Agent, or Firm* — Robinson & Cole LLP (57) ABSTRACT

A coupling includes first and second annular flanges in spaced relation across a gap. At least one resilient element is disposed in the gap in abutting relation to the first and second annular flanges. A first plurality of fasteners extends from the first annular flange, through the at least one resilient element, to the second annular flange, and a second plurality of fasteners extends from the second annular flange, through the at least one resilient element, to the first annular flange. Fasteners in the first plurality of fasteners is disposed in alternating fashion with fasteners in the second plurality of fasteners.

17 Claims, 9 Drawing Sheets

COUPLING

BACKGROUND

Grid couplings are a known type of coupling used in applications such as rock and aggregate conveyors where both high torque levels and damping requirements are desired. Unlike other known coupling types, for example gear and disc couplings, grid couplings are uniquely configured to reduce vibration by as much as 30%, and to cushion shock loads, which protects and extends the life of driving and driven power transmission equipment.

A typical grid coupling includes two hubs, each having a series of teeth, which are installed in opposing relation. A grid spring element is meshed between the teeth to mechanically interconnect the two hubs. A cover, hereafter referred to as housing, is disposed around the grid spring to protect against contamination by debris and to enclose a lubricant that is used to lubricate the interfaces between the grid spring and the teeth. One example of a grid coupling can be seen in US 2020/0011382 to Burdeshaw et al.

Known limitations of grid couplings include their limited ability to accommodate misalignment, and their susceptibility to contamination along the mechanical interfaces between the grid spring element and the teeth of the driving and driven shafts. While effective at damping vibrations, grid couplings are not especially well configured to operate in the presence of parallel shaft misalignment that is more than a minimal angle, for example, about 0.5 degrees. Additionally, grid couplings require periodic cleaning and reapplication of lubrication, and replacement of seals and housing gaskets, which typically requires disassembly of the coupling and a laborious process to realign the coupling during reinstallation.

For example, radial or O-ring seals disposed to seal a neck of each hub to the housing require removal of the hub for installation insofar as the seal is not sufficiently large to stretch over the teeth of the hub, which may also cut or otherwise damage the new seal during installation, and must be installed from the external end of the hub relative to the coupling. Reinstallation of the hubs onto the rotating shafts requires a careful realignment such that the parallel and angular shaft misalignment is within specifications, and is an especially time consuming process when a heated interference fit is used to couple the hubs onto the rotatable shafts.

SUMMARY

The disclosure describes, in one aspect, a coupling for rotationally engaging a first shaft and a second shaft, the first and second shafts having free ends disposed in spaced relation to one another. The coupling includes a first annular flange that is engageable or adapted to be engaged on a free end of the first shaft, and a second annular flange that is engageable or adapted to be engaged on a free end of the second shaft. The second annular flange is disposed generally aligned in an axial direction with the first annular flange along a centerline axis, and in spaced relation to the first annular flange across a gap. At least one resilient element is disposed in the gap in abutting relation to the first and second annular flanges. A first plurality of fasteners extends from the first annular flange, through the at least one resilient element, to the second annular flange, and a second plurality of fasteners extends from the second annular flange, through the at least one resilient element, to the first annular flange. Fasteners in the first plurality of fasteners is disposed in alternating fashion with fasteners in the second plurality of fasteners.

In one embodiment, each of the free end of the first shaft and the free end of the second shaft forms splines in a radially outer portion thereof, and each of the first annular flange and the second annular flange forms teeth along an inner portion thereof that are adapted to mesh with the splines.

In another embodiment, the first annular flange is connected to a first collar, the first collar having a generally hollow cylindrical shape that is adapted to engage the free end of the first shaft, and the second annular flange is connected to a second collar, the second collar having a generally hollow cylindrical shape that is adapted to engage the free end of the second shaft.

In yet another embodiment, each free end of the first and second shafts forms an end flange has a generally flat shape with uniform thickness in the axial direction that defines a flange surface having a cylindrical shape, and each flange surface includes a plurality of threaded openings that are spaced apart and extend in a radial direction towards the centerline. A plurality of mounting plates having a stepped cylindrical shape that includes at least an outer cylindrical wall and an annular face extends peripherally around each of the free ends of the first and second shafts. The respective outer cylindrical walls include through-openings accommodating fasteners engaged with the plurality of threaded openings to connect the plurality of mounting plates to the first and second shafts, and annular faces of the plurality of mounting plates together define the first and second annular flanges.

DETAILED DESCRIPTION

This disclosure relates to mechanical couplings and, more specifically, to grid couplings such as the couplings used to transfer rotational motion in an industrial process, for example, a conveyor system. Known grid couplings typically include two hubs having teeth that extend radially outwardly, which are interconnected by a resilient metal or spring element that meshes the teeth between the two hubs. Relative motion of the hubs, especially when transferring impact or sudden loads, can be damped by the resilient or spring element that connects the hubs. During operation, rubbing and friction within the coupling, which can be detrimental to the operation and longevity of the coupling, can be alleviated by clean useable lubricant. Any damage to the seal or gasket that seals the lubricant within a housing of the coupling that surrounds the spring, for example, during installation, can jeopardize the life of the lubricant and therefore the life of the coupling. To maintain the lubricant in place within the coupling, and to avoid contamination of the working surfaces and components of the coupling, the housing encloses the moving parts of the coupling.

The couplings in accordance with the present disclosure advantageously eliminate the metal-to-metal contact between the teeth of the two hubs and the spring element by replacing the spring with rubber or rubberized composite resilient elements or shoes, which are disposed between mating flanges that attach to the input and output shafts or hubs of the coupling. The resilient shoes also eliminate the need for use of lubricant, which in turn simplifies the structure of the coupling such that a housing becomes optional and used in instances where the rotating components of the coupling are merely shielded from unintended contact with external structures in their operating environment. The couplings in accordance with the disclosure, in addition to being simpler to use and maintain, are also better suited than known couplings to assemble and to accommodate larger shaft misalignments, and can reliably transmit about 50% additional torque loading when compared to traditional couplings of the same frame size.

The embodiments for torque couplings described herein are well suited for industrial and residential equipment to transfer mechanical rotational energy. Such couplings can be used to connect the sources of mechanical energy to equipment which uses the mechanical energy to complete tasks. For example, a coupling may be used to connect an electric motor to a fluid pump which moves liquid from one point to another. In order to transmit large amount of mechanical energy through a rotating shaft, hereafter referred to as torque, certain couplings that commonly use splined or gear teeth on the outer circular surface of a hub are used with a coupling torque transmitting element to transmit torque from the driver coupling flange to the driven coupling flange. Due to the limitation of current coupling designs, the mating splined or gear flanges which join the splined or gear hubs are of a singular circular construction and made from steel. This results in replacing the entire assembly, hubs, elements, and flanges, during failure through moving all the connected equipment. Failure is often a result of failure in lubrication as the assembly requires lubrication due to the inherent nature of steel in the flanges and the steel in the hubs.

The flange assembly in accordance with the present disclosure can transmit more torque then the traditional splined or gear single piece coupling flanges, is split for quick installation, uses a non-lubricated element to connect the flanges and hence removing the potential failure of lubrication, and does not destroy the hubs in the event of failure. Additionally, due to the novel features of the assembly the entire coupling assembly is: torsionally balanced, mechanically retained, and can accommodate larger amount of shaft misalignment.

Prior to the invention, couplings with high torque density value either required high precision machined steel components and/or lubrication of steel components. Where torque density is defined as the amount of torque per diametrical size of the coupling. For example, a coupling with a low torque transmission rating and a large diameter would have a smaller torque density then that of a high torque transmission rating and a small diameter. Large torque density is beneficial as the cost of the coupling is directly proportional to the overall size of the coupling. The larger the coupling the larger the weight of the coupling, which effects the power transmission application through larger rotational inertia in the system and proper lifting requirements for maintenance and installation.

Metallic style lubricated couplings use single circular piece flanges which require movement of the driver and driven equipment to install new couplings in the event of previous coupling failure. The singular pieces are also heavy, requiring special lifting equipment. When a coupling fails, its components must be replace as the wearable surfaces are between the hubs and the flanges.

Metallic style lubricated couplings require consistent maintenance as the life of the coupling is dependent on the life of the lubrication inside the coupling. Maintenance of the coupling requires an additional investment by the user of the coupling as large torque dense couplings are usually placed in locations away from easy accessibility. This is a result of the amount of torque the application generates and maintaining proper guarding from the rotating coupling and equipment.

The present disclosure solves these problems by using a split flange assembly that allows the torque carrying lubrication free element to attach to currently used splined hubs. The split flanges allow the flange and element assembly, hereafter referred to as coupling, to attach to the hubs without moving the driver or driven equipment, while increasing the torsional holding power of the coupling. For example, the torsional holding power of a coupling in accordance with the disclosure, as compared to a traditional coupling of the same size, was measured as 146% compared to the torsional holding power of the traditional coupling.

By splitting the flanges, the overall weight of each installed item is decreased, resulting in less specialized lifting equipment during installation. The solution uses multiple circular members that allow the element to be joined to the flanges. The solution uses an odd number of circular members which dynamically balance the rotating circular coupling. The balance decreases eccentric forces acting on the driver and driven equipment. The balance can be better than the current design as the current design uses a semi-solid lubrication, which is inherently unbalanced.

The solution can accommodate such a large torsional strength by: asymmetrically spacing the splined teeth for uniform tooth loading, using in cut gear teeth in a splined application, and using additional fasteners to further press the flanges teeth into the hub teeth. The solution can use in cut gear teeth, with in-cut trough radii for ease of installation during installation while maximizing spine tooth strength. The solution can use large trough radii, not incut, for ease of installation during coupling installation which allow for non-metallic material to be used. The non-metallic material allows for decreased cost and environments where metallic materials cannot be used while also decreasing cost. Testing has shown a decrease cost of 65% compared to metal solutions.

The solutions can be fixed axially from moving through multiple clamp bolts and dovetail joints. The spacing of the clamp bolts and sizing of dovetails allow for one-way installation. Making installing easier. Solution installation is easier, in addition to previously mentioned benefits, from a positive stop in one of the flanges. The positive stop is created by alternating flanges having splines only pass partially through the flange. Therefore, during installation all the flange clamp fasteners always align. The positive flange can also increase the torsional strength of the splined teeth by 140%, which in turn provides 205% more torsional strength then the current design. The positive stop can also be achieved through a bracket, thus allowing for less styles of flanges to complete an entire coupling.

The solution uses elliptical pockets in the flanges to shroud the fasteners which join the element to the flanges. These ellipses increase the potential misalignment of the hubs by 400% and also removes stress concentrations from the element itself. Therefore, allowing for more torque capacity of the element.

The solution can use a cover. The cover may be axially or vertically split to protect the coupling from environmental contamination such as from chemical or UV attack. The solution may also not use splines at all but merely fasten using bolts or the like to the hubs as well. The solution may be integrated right onto the hubs as well. Splines in flanges may also be comprised of pressed dowel pins. These pins can be used to transmit the same amount of torque through the flanges, without the manufacturing limitations of splined teeth. Dowel pins also use asymmetric spacing to maximize uniform engagement of splined joint when installed.

The solution teeth may use in cut radius at the trough of the tooth, to allow for ease of installation by the end user during splined hub installation and to increase strength. Because splines do not traditionally use profiles similar to spur gears, nor is the size of the in-cut designed to accommodate misalignment during installation, this feature increases the strength and reliability of the disclosed embodiments.

The solution teeth my use large trough radii, to allow for ease of installation by the end user during splined hub installation and to allow for a larger breadth of flange materials. Traditionally non-metallic splined teeth are limited in size due to the cross section of the teeth. By using the trough radii, the flanges may be injection molded with plastic. Which represents decreased manufacturing cost. From testing the direct material cost would decrease by 65%.

The solution may use an elastomeric, steel, plastic, or non-metallic fiber reinforced resin plate to join the driver and driven flanges, hereafter referred to as the element. The flanges use an odd number of joining members in order to allow the assembly to remain torsionally balanced from loading of the element through torsional symmetry. The benefit of the balance is less axial load on driver and driver equipment. The solution is split in multiple identical pieces to allow for ease of installation, as the mating splined hubs may stay in place from previous coupling operation.

The solution uses flange and element configurations with teeth designs to ease installation. As the partially splined flange teeth lengths are identical, when installing flange and element assemblies from opposite direction then the clamp bolts will align. This speeds up installation.

Additionally, in the event of catastrophic clamp bolt failure, the system of fully and semi splined flanges act as mechanical stops to maintain flange and element assembly connection to the splined hub. Flanges are fixed to splined hubs using clamp bolts. One or more clamp bolt may be used on each flange. The clamp bolts prevent axial movement of the splines, allow for looser machining tolerances, and provide a secure fit in the event of application overload. The looser machining tolerances decrease the overall cost the product.

The solution may use additional fasteners which tighten radially onto the splined hubs for additional torsional holding power. To allow for use of commercially available fasteners, which decreases lead-time and cost, flanges allow for elliptical pockets to shroud the element joining fasteners heads. By placing the fastener heads in the flanges and not the element, the design avoids having increased stress concentrations in the element and therefore can increase the overall rating of the flange and element assembly. The elliptical shape allows for fastener movement during splined hub misalignment.

Splined teeth may be symmetrically spaced or unsymmetrically spaced in order to ensure proper loading on all splined teeth. By varying the spacing on the teeth, the overall torsional strength of the assembly is increased on square splined hub applications. Flange and element assembly may use cover to protect the assembly from environmental wear such as chemical attack and impacts. The cover is horizontally or vertically split but allows the assembly to be shrouded by the cover.

Flange clamp joints may use non-flat joining surfaces but instead use positive engagement geometry to further increase joint strength of the flanges, for example, a dovetail design. Flanges may also be bolted to hubs, in hubs without splines. Flanges may use dowel pins to connect to splined hubs to eliminate splined tooth forming during manufacturing. Flanges may be integrated into hubs, and connect to a keyed, or not key shafted with setscrew, bushings, interference fits or alike. The integral shaft flange and hub may be split as well.

In the description that follows, structures, elements and/or features that are the same or similar These and other features will now be described in additional detail. A coupling 100, which can also be referred to as a grid coupling for historical purposes for the type of coupling it replaces and improves upon, is shown from a side perspective in FIG. 1 and in section view in FIG. 2. The coupling 100 is intended to rotationally engage two shafts, for example, a first shaft and a second shaft. In reference to these figures, the coupling 100 is connected between first and second splined shafts 102 and 104. Each of the splined shafts 102 and 104 includes a splined portion 106 that forms a plurality of teeth 108 extending peripherally outwardly with respect to central axis, C, the teeth in the plurality of teeth 108 extending peripherally around an end portion of each shaft 102, 104 and being in opposed relation such that the pluralities of teeth 108 of the shafts 102 and 104 are disposed adjacent to one another across a gap 110 defined axially along the central axis C between the two shafts 102, 104.

Figure 2:
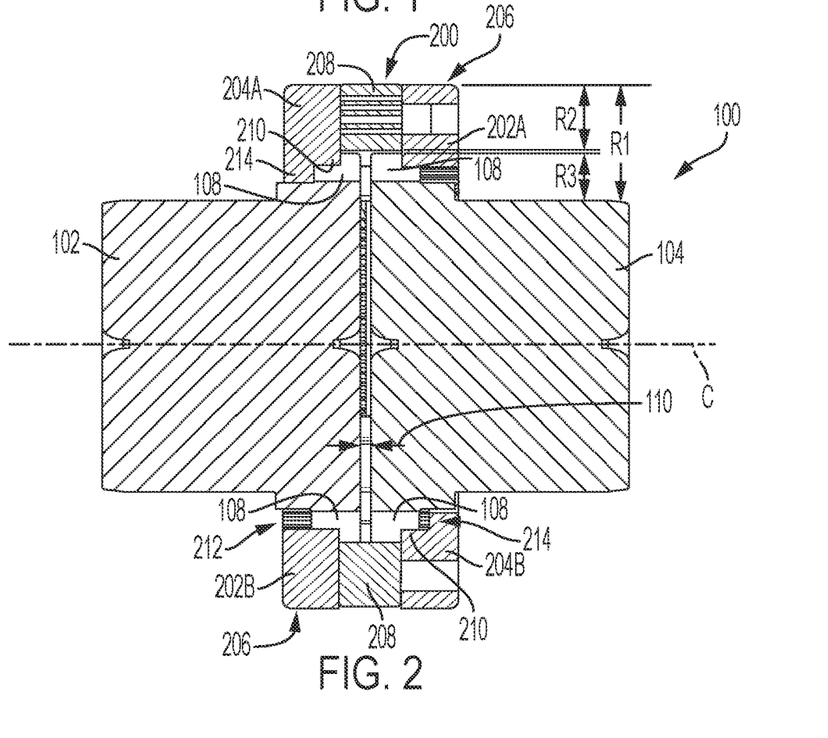
FIG. 2 is a section view of the grid coupling of FIG. 1.

A coupling assembly 200 is disposed to torsionally interconnect or mesh the splined ends of the two shafts 102, 104. As shown, the coupling assembly 200 includes a first set of flange portions 202, 204, which are connected to one another and together form an annular flange 206 (total of two flanges 206, a first flange and a second flange) disposed around the end of each shaft 102, 104. Each annular flange 206 extends radially outwardly with respect to each shaft 102, 104 and the pluralities of teeth 108 by a distance, R1, with respect to an outer cylindrical surface 112 of the respective shaft 102, 104. The first and second annular flanges 206 are generally flat and are disposed in a generally axially aligned fashion along the central axis and in spaced relation to one another across the gap 110. Disposed between the two flanges 206, and within the gap, are two resilient elements or shoes 208, each having a radial thickness, R2, which is less than R1 and which is sufficient to span at most a radial distance that is less than a difference between R1 and a radial height R3 of the pluralities of teeth 108, as shown in FIG. 2.

Each flange portion 202 and 204, and thus each of the annular flanges 206 forms teeth 210 along an inner portion thereof, as explained below, which mesh with the plurality of teeth 108 on the respective shaft 102, 104 to rotatably engage each flange or splined portion 106 with its respective shaft 102, 104. Fasteners extending through one of the flanges 206, through the resilient shoes 208, and being threadably engaged with the other flange 206 torsionally and rotatably engage or couple the two shafts 102 and 104 for rotation about the central axis, C. It should be appreciated that misalignments can cause the two shafts 102 and 104 to rotate at an angled axis relative to the central axis C, which is shown straight in FIG. 2 for sake for discussion and illustration.

Figure 3:
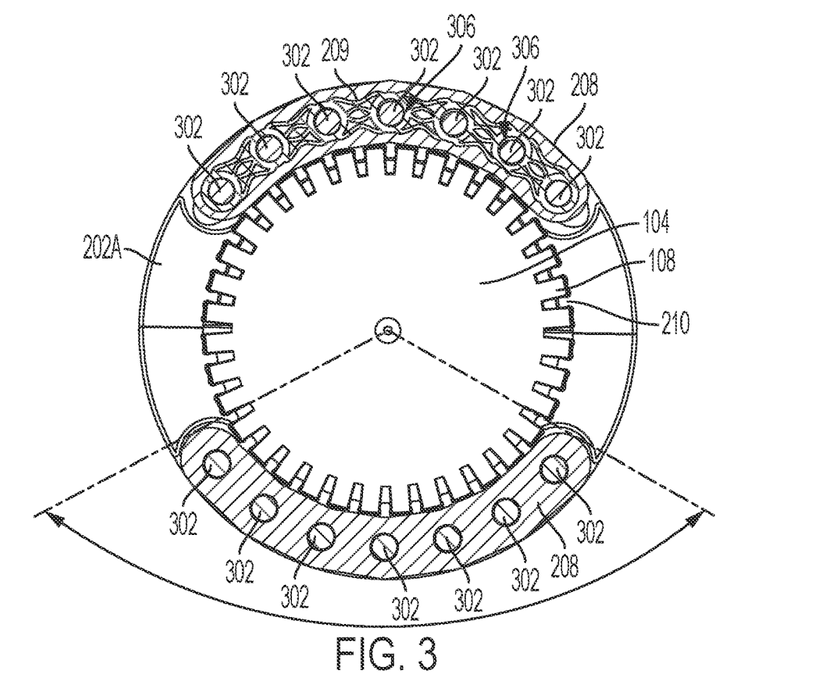
FIG. 3 is a partially disassembled and sectioned view through a portion of the grid coupling of FIG. 1.
Figure 4:
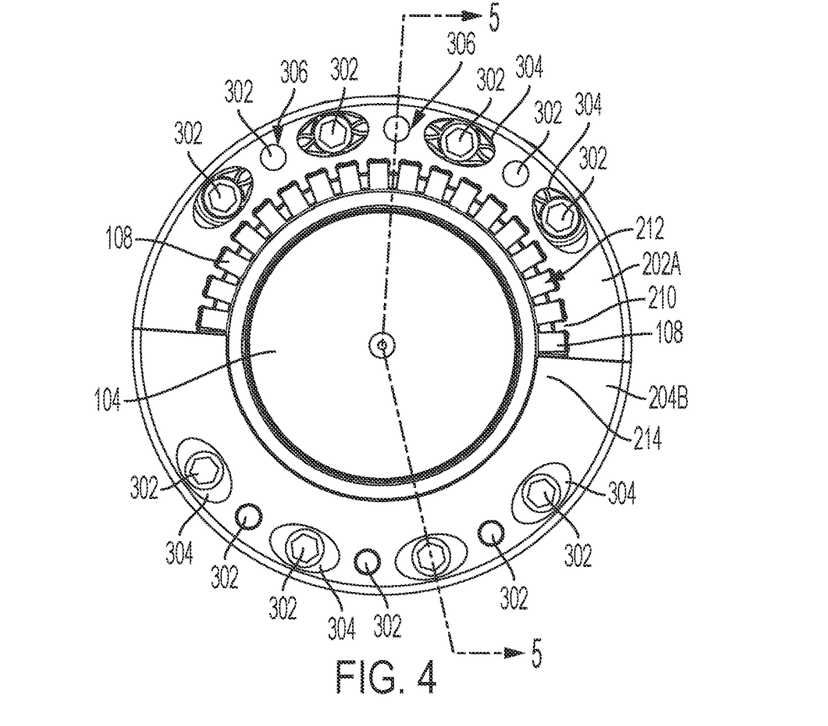
FIG. 4 is an outline view from a rear perspective of the grid coupling of FIG. 1.
Figure 5:
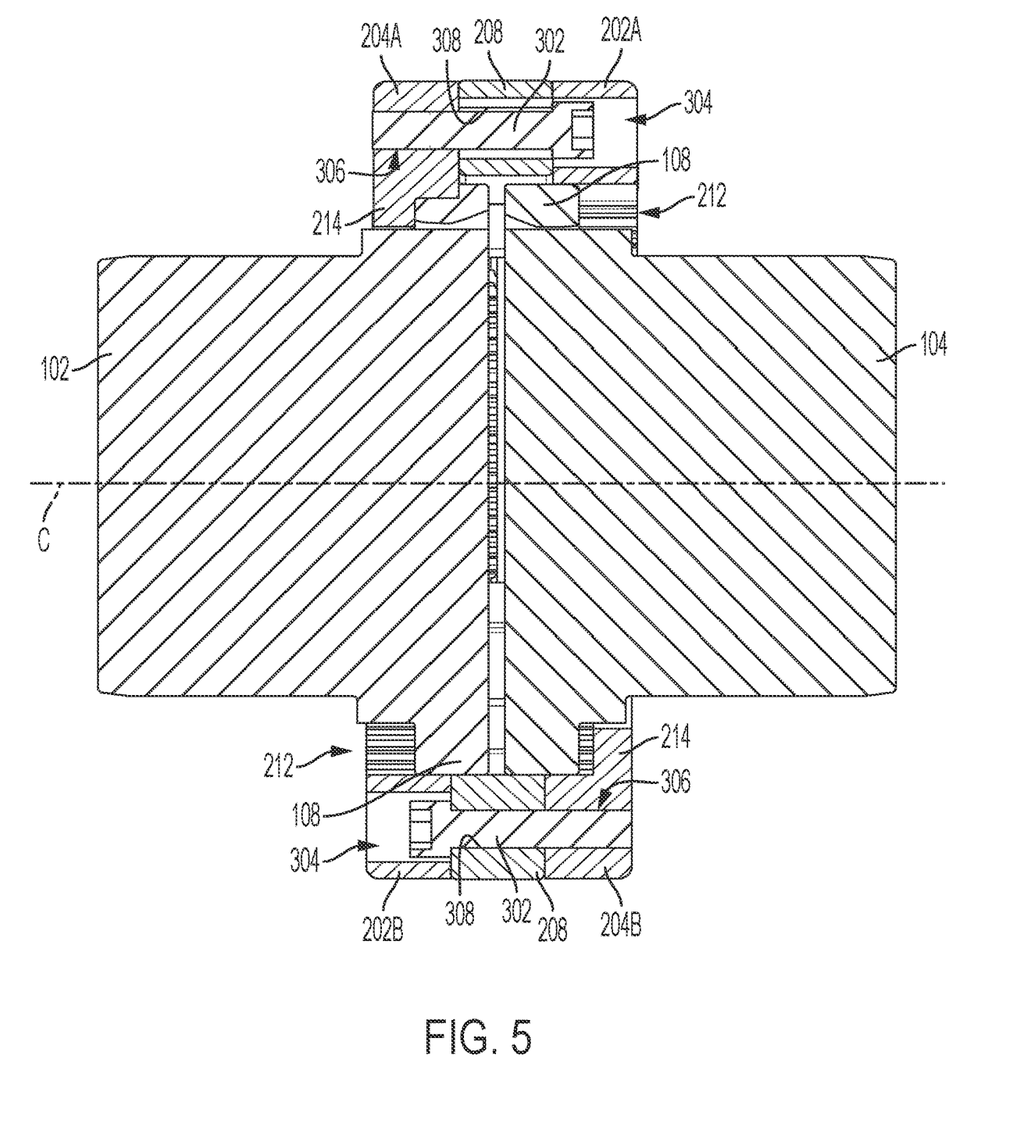
FIG. 5 is a section view through the grid coupling of FIG. 1.

To illustrate the fastener connection between the two flanges 206, reference is made to FIGS. 3, 4, and 5. In FIG. 3, a partial section is shown through the coupling 100 in which one of the resilient shoes 208 is sectioned to show internal structures. As can be seen in this figure, each shoe 208 has a generally circular shape that extends over a segment that is less than 180 degrees around the periphery of the coupling. Depending on the size of the coupling, each shoe can cover up to 180 degrees of the periphery or even the entire periphery, in which case the shoe is formed as an annular flange. To provide flexibility and absorb misalignment, two shoe sections are shown in FIG. 3, each spanning or extending along 120 degrees of the peripheral length of the coupling. Two shoes are shown in FIG. 3, but it should be appreciated that more than two shoes can be used.

In FIG. 4, an outline view is shown from an end perspective to show the orientation of fasteners. In FIG. 5, a non-symmetrical diameter section is taken through two opposed fasteners to show their orientation. In reference to these figures, it can be seen that each flange portion 202 and 204 includes threaded and through holes formed in alternating fashion to accommodate the heads or threads of fasteners 302 disposed through one flange portion and threadably engaged through a corresponding opposite flange portion in mating the two sides of the coupling assembly 200.

Figure 1:
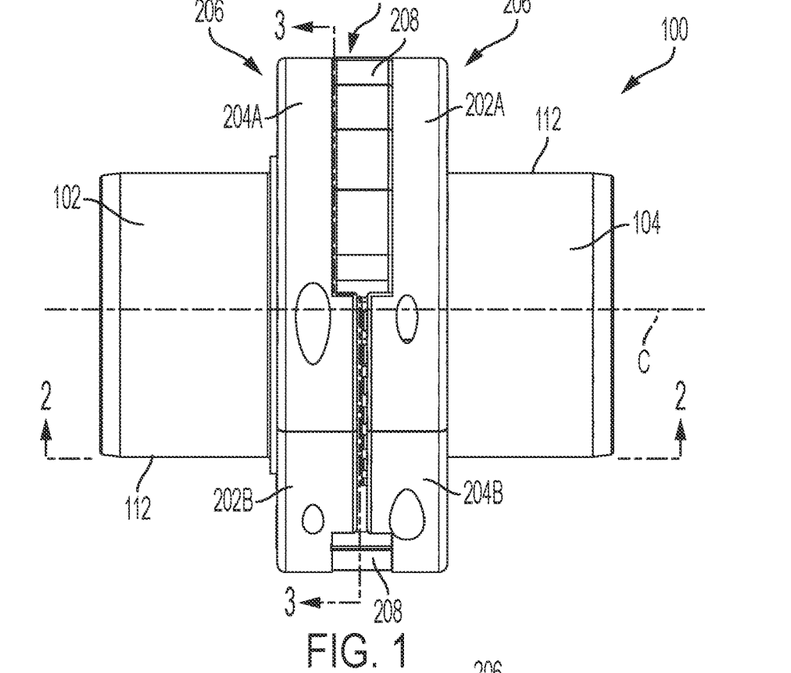
FIG. 1 is an outline view from a side perspective of a grid coupling in accordance with the disclosure.

More specifically, and as is also shown in FIGS. 1 and 2, the coupling assembly includes two thru-flange portions 202, and two stop flange portions 204. For sake of discussion, and consistent with the illustrated embodiment, the flange portions can be formed in two varieties that cooperate with one another. In reference to FIG. 2, it can be seen that a first variety of flange portion or thru-flange portion 202 includes a thru-bore 212 around the pluralities of teeth 108 that permits the thru-flange portion 202 to slide uninterrupted over and, if desired, past the teeth 108 in an axial direction along the axis, C. The thru-flange portion 202 is mated with a second variety of flange portion or a stop flange portion 204, which includes a stop wall 214 that blocks the axial motion of the stop flange portion 204 in the axial direction along the axis C when the wall 214 abuts the outer axial end of the plurality of teeth 108.

Each pair of a thru-flange portion 202 and a stop flange portion 204 (two total) that are used in the coupling assembly are mated together or engaged with bolts in an axial direction, and are also arranged in opposite axial orientation, as shown in FIG. 2, such that each thru-flange portion 202 is engaged with two stop flange portions 204 (A and B), one axially and the other peripherally, and each stop-flange portion 204 is engaged with two thru-flange portions 202 (A and B), one axially and the other peripherally to form the coupling assembly 200. The resilient shoes 208 are disposed, one each, between each axially engaged pair of thru-flange portions 202 and stop flange portions 204.

Due to minor structural differences, which are described below, a first pair of flange portions in the axial direction includes one thru-flange portion 202A and one stop flange portion 204A, and a second pair of flange portions in the axial direction includes one thru-flange portion 202B and one stop flange portion 204B, as denoted in FIGS. 1 and 2. In this arrangement, the thru-flange portion 202A is axially engaged with a stop flange portion 204A and is also peripherally engaged with a stop flange portion 204B. Similarly, the thru-flange portion 202B is axially engaged with the stop flange portion 204B and is also peripherally engaged with the stop flange portion 204A. The stop flange portion 204A is axially engaged, through a resilient shoe 208, to the thru-flange portion 202A and is also peripherally engaged with the thru-flange portion 202B. Finally, the stop flange portion 204B is axially engaged, through a resilient shoe 208, with the thru-flange portion 202B and is also peripherally engaged with the thru-flange portion 202A.

In reference now to FIGS. 3, 4 and 5, it can be seen that the thru-flange portion 202A on the top half of the figure includes seven fastener openings, of which four are oval shaped, through bore openings 304 and three are threaded openings 306. This arrangement allows for each fastener 302 (FIG. 5) to be inserted in one axial direction or the other through the bore openings 304 in the thru-flange portion 202A to threadably engage threaded openings 306 formed in the stop flange portion 204A, or through corresponding bore openings 304 in the stop flange portion 204A to threadably engage the threaded openings 306 in the thru-flange portion 202A. 12. It is noted that the through-bore openings 304 has an oval or elliptical shape that is enlarged relative to a head of the fasteners 302. When the shoe 208 is able to carry the clamp load applied by the fasteners 302, the heads of the fasteners 302 are clear of the openings 304. However, in the event that the shoe 208 loses its ability to carry or support the clamping load between the annular flange portions, for example, in case of failure or fire, the fasteners themselves will engage the sides of the opening and the flange, via the openings, will apply a tangential force onto the head portions of the fasteners when the shoe or resilient element has failed or is otherwise unable to support a clamping load applied by the between the first and second annular flanges to maintain functionality of the coupling in an emergency mode of operation.

As shown in FIG. 4, the stop flange portion 204B forms seven fastener openings, of which four are through bore openings 304 and three are threaded openings 306. This arrangement allows for each fastener 302 (FIG. 5) to be inserted in one axial direction or the other through the bore openings 304 in the stop flange portion 204B to threadably engage threaded openings 306 formed in the thru-flange portion 202B, or through corresponding bore openings 304 in the thru-flange portion 202B to threadably engage the threaded openings 306 in the stop flange portion 204B.

In each case, the fasteners 302 interconnecting the flange portions pass through bores 308 formed in the resilient shoes 208. Each resilient shoe 208 forms seven bores 308 in the embodiment shown, which accommodate the seven fasteners 302 (four inserted in one axial direction, and three in the other) interconnecting the flange portion pairs, i.e. the thru-flange portion 202A with the stop flange portion 204A, and also seven more (four in one direction and three in the other) to connect the stop flange portion 204B with the thru-flange portion 202B. As can be appreciated, depending on the diameter size of the coupling and size of the fasteners more or fewer fasteners can be used. As shown in FIG. 3, where a partial section is taken through the top resilient shoe 208, each shoe may be made from a molded rubberized or otherwise resilient material over a matric of structural elements 209, which may be more rigid than the over molded resilient material to form a composite structure having improved stiffness over a purely resilient shoe, which may be selectively required depending on application.

Figure 6:
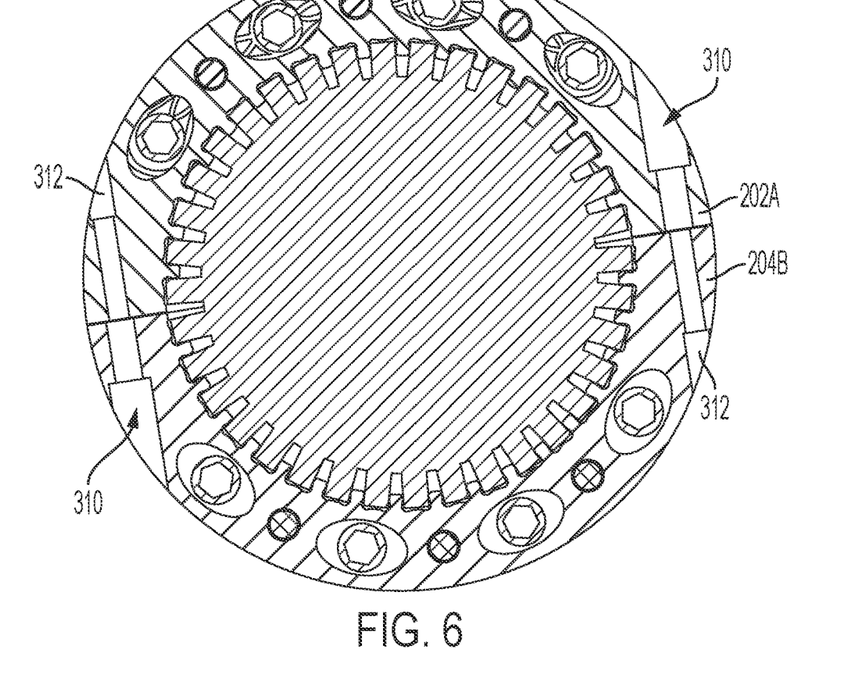
FIG. 6 is a section view through a portion of the coupling of FIG. 1.

By inserting the same number of fasteners 302 in one axial direction or the other to engage the axial flange portion pairs (A and B), a balanced loading on the shoes can be maintained in a diametrical and/or radial direction around the coupling assembly 200 and across the two shafts 102 and 104. In one embodiment, fasteners extending through a bore 310 and a threaded opening 312 extending tangentially relative to the shafts 102 and 104 peripherally connect the flange portions, specifically, the stop flange portion 204A with the thru-flange portion 202B and the thru-flange portion 202A with the stop flange portion 204B. As can be seen in FIG. 6, to preserve loading balance in a peripheral direction, the fasteners are oriented in two axially opposed directions that are parallel and tangentially related in diametrically opposite locations around a diameter of the shafts 102 or 104.

Figure 7:
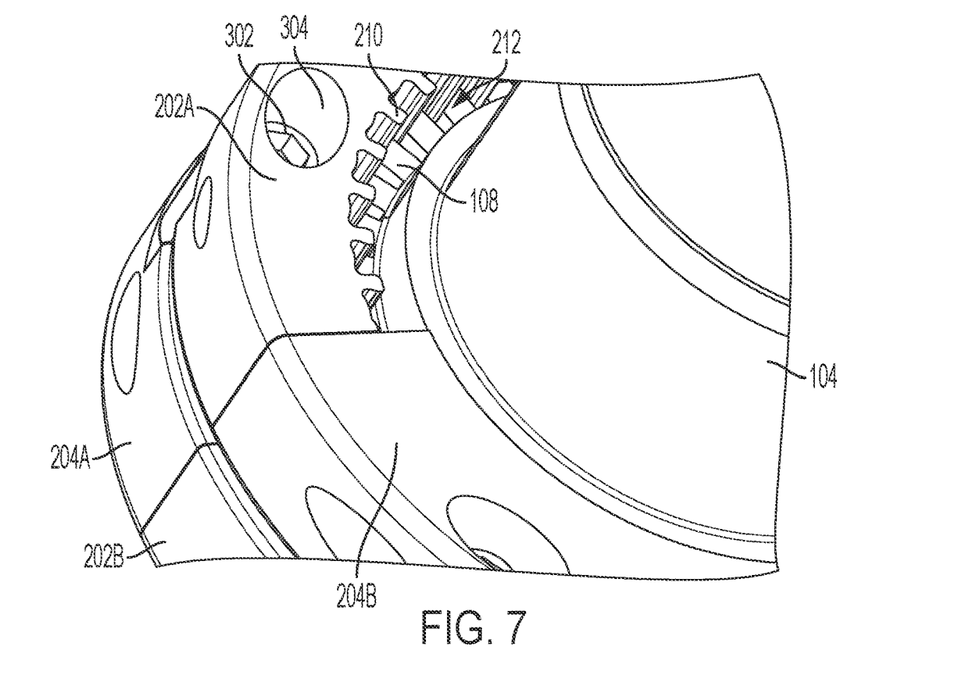
FIG. 7 is an enlarged detail view of a portion of the coupling of FIG. 1.

A close-up view of a portion of an interface between the thru-flange portion 202A and the stop flange portion 204B is shown in FIG. 7. In reference to this figure, it can be seen that the bore openings 304 have a generally elongated or elliptical shape that accommodates the head of the fastener 302. The bore 212 is open, and previously described, and the teeth 210 extend the entire length axially of the bore 212.

Figure 8:
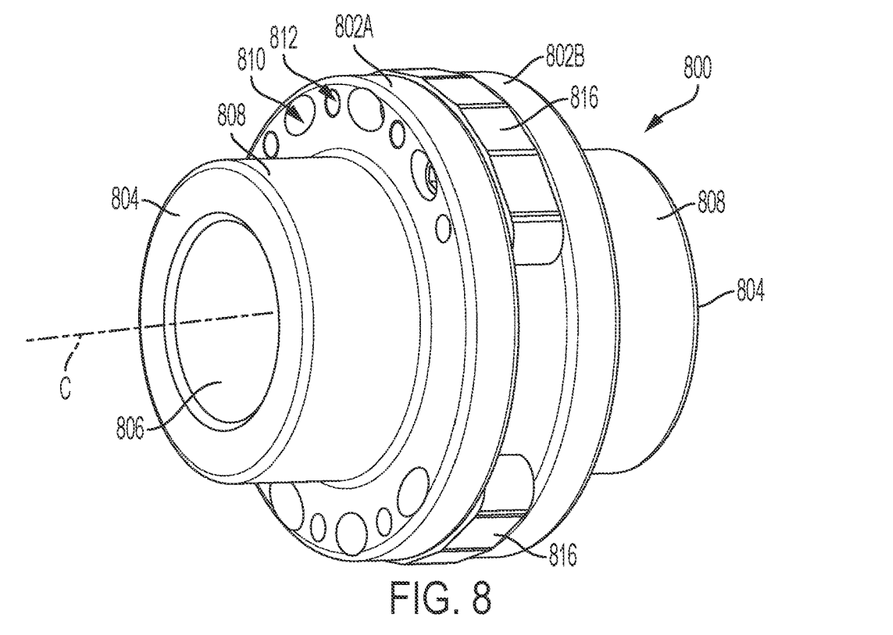
FIG. 8 is an outline view of an alternative embodiment for a grid coupling in accordance with the disclosure.

An alternative embodiment of a coupling 800 is shown in FIG. 8. The coupling 800 structurally differs from the coupling 100 in that in is configured to attach and torsionally connect the ends of two smooth shafts (not shown), i.e., shafts that do not include splines or hubs having teeth formed thereon as was the case with the shafts 102 and 104 (FIG. 2). In this embodiment, the coupling includes solid collars that are disposed on the hubs, each of which forms a respective annular flange. The two annular flanges, one on each shaft, are positioned in generally aligned position axially across a gap 110 (FIG. 1), and are connected using resilient shoes and fasteners providing a balanced load between the two flanges, similar to the coupling 100.

More specifically, the coupling 800 includes two flanged collars, a first flanged collar 802A that includes a first collar, and a second flanged collar 802B that includes a second collar. Each flanged collar 802A and 802B includes a collar portion 804 (first and second collars) which is engageable onto the free end of a shaft (now shown), for example, by an interference or thermal shrink fit, or may alternatively include anti-rotation features such as keys, set screws and the like, in the known fashion (none of which are shown here for simplicity).

Figure 9:
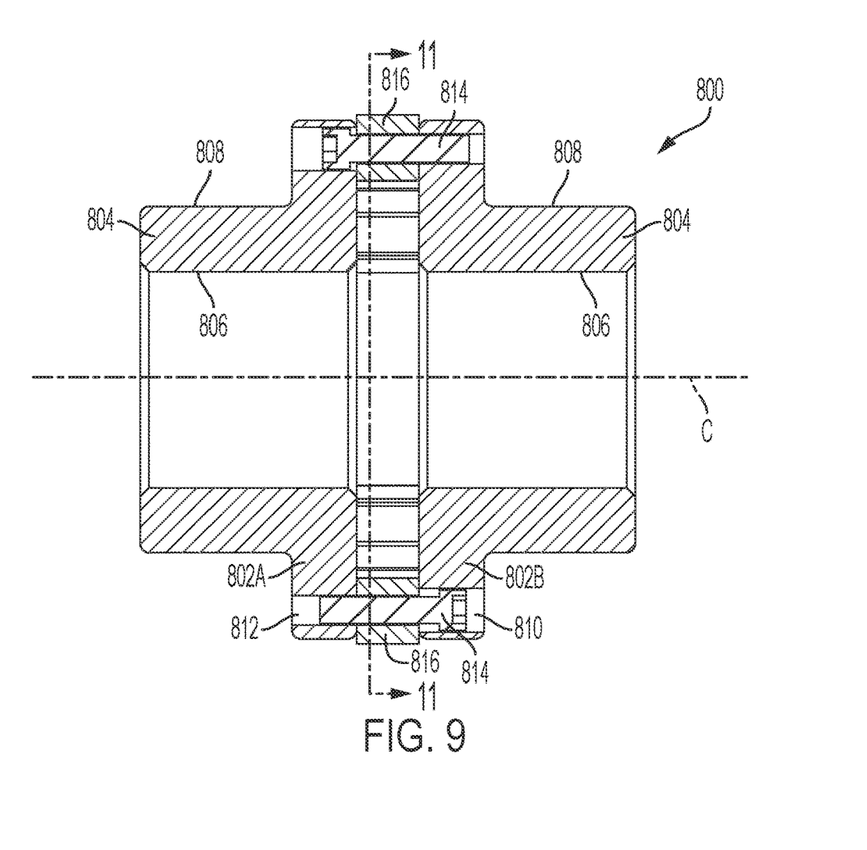
FIG. 9 is a sectional view of the grid coupling of FIG. 8.
Figure 10:
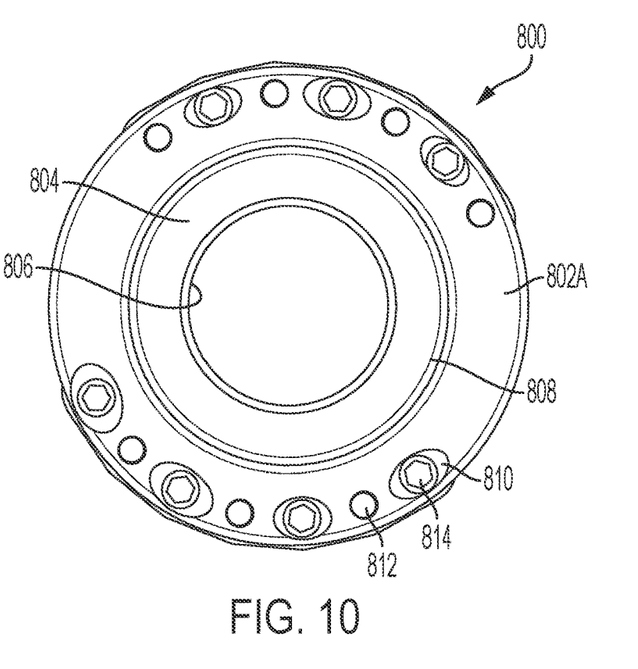
FIG. 10 is an outline view from a front perspective of the grid coupling of FIG. 8.

The collar portion 804 includes an inner bore 806, into which the shaft (not shown) is inserted, and an outer cylindrical surface 804. At ends facing one another, each collar portion 804 forms the flanged collars 802A and 802B. Each flanged collar 802A and 802B has a flat, annular shape that extends radially outwardly from the outer cylindrical surface 804. Each flanged collar 802A and 802B further includes through openings 810 and threaded openings 812 that accommodate therein fasteners 814, as shown in FIG. 9, which is a cross section view through the coupling 800. As can be seen from FIG. 8, the fasteners 814 are arranged to be installed in alternating axial directions or orientations between the two flanged collars 802A and 802B, in a similar configuration as in the coupling 100, to provide a balanced loading, as is also shown in FIG. 10, which is a perspective rear view of the coupling 800. Also similar to the coupling 100, two resilient shoes 816 are disposed between the exposed, flat annular faces of the flanged collars 802A and 802B.

Figure 11:
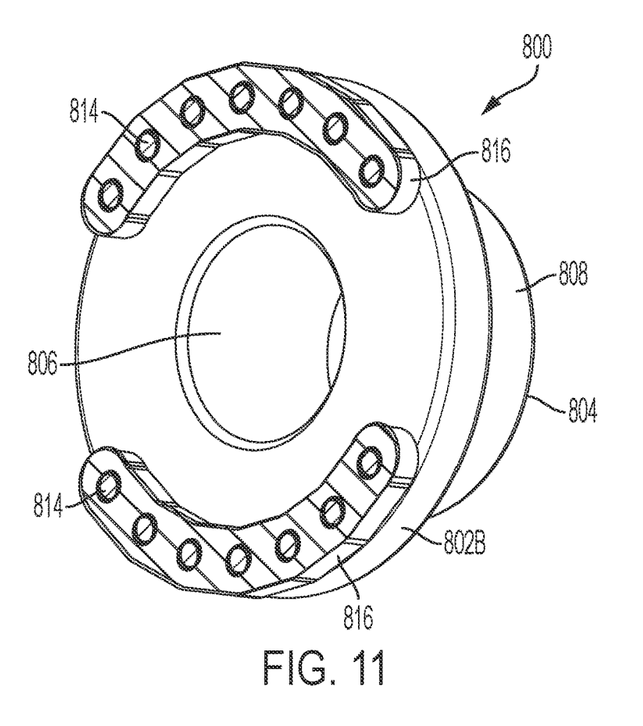
FIG. 11 is a partially sectioned view of the coupling of FIG. 8.

As shown in FIG. 9, the fasteners extend in one axial direction or the other relative to a centerline, C, through a through opening 810, through a bore formed in the resilient shoe 816, and into the threaded opening 812, where they engage the respective one of the flanged collars 802A and 802B and are tightened to clamp the flange collars 802A and 802B together and the resilient shoe 816 between them. As is also shown in FIG. 11, seven fasteners connect the two flanged collars 802A and 802B together on either diametrical end, for a total of 14 fasteners and two resilient shoes to complete the coupling 800, but more than two segments, and fewer or more than 14 fasteners can be used depending on the size and configuration of the coupling 800. The resilient shoes 816 may also include reinforcements internally and be formed as composite structures similar to the shoes 208 having structural elements 209, as shown in FIG. 3.

Figure 12:
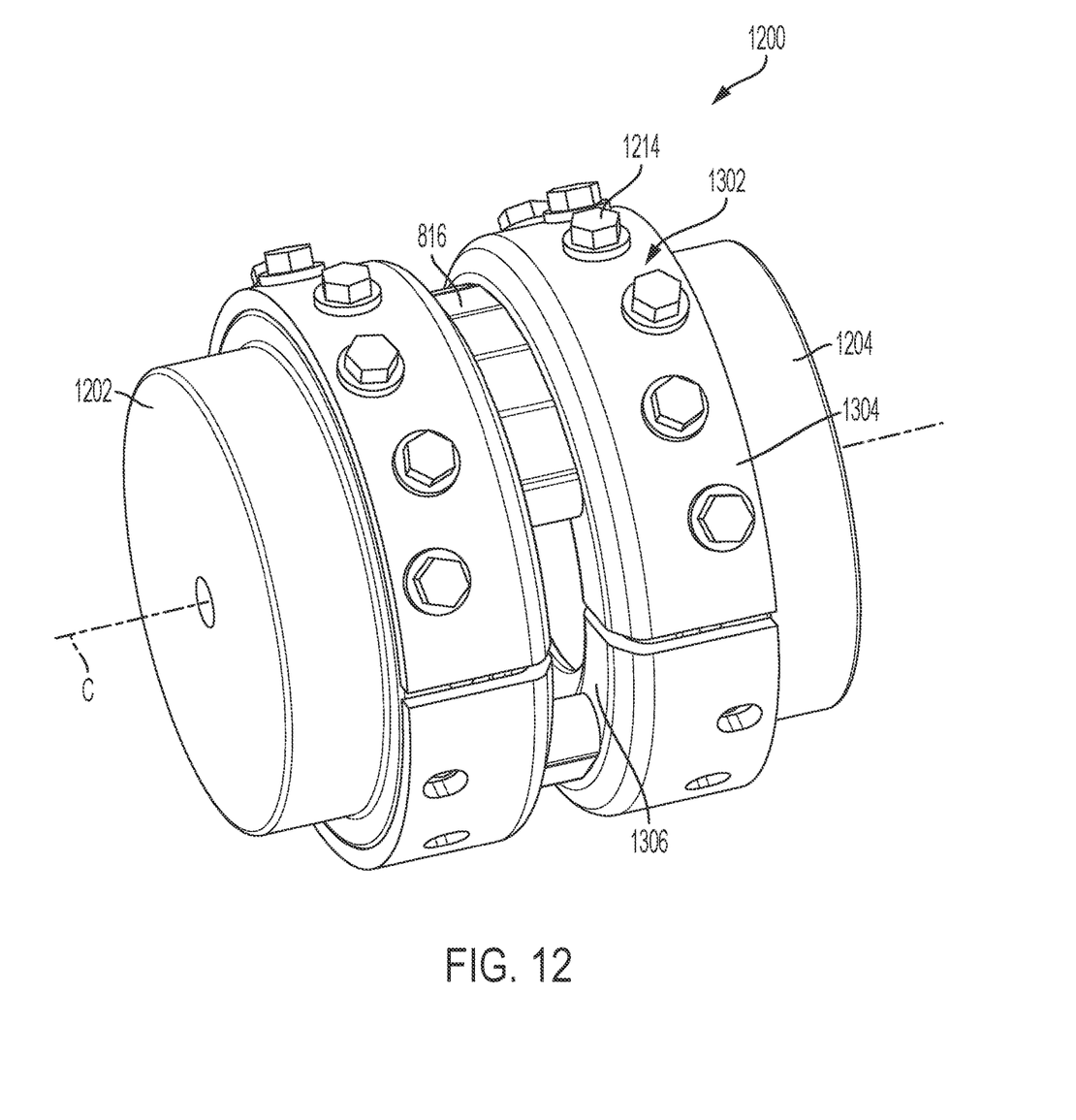
FIG. 12 is an outline view of an alternative embodiment for a grid coupling in accordance with the disclosure.
Figure 13:
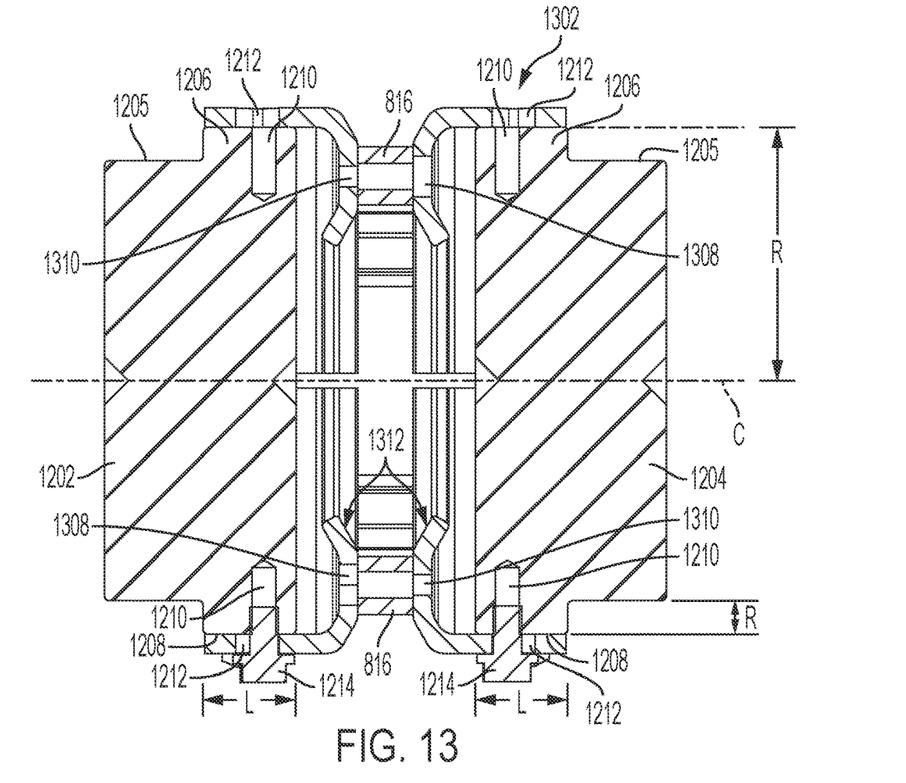
FIG. 13 is a section view of the grid coupling of FIG. 12.
Figure 14:
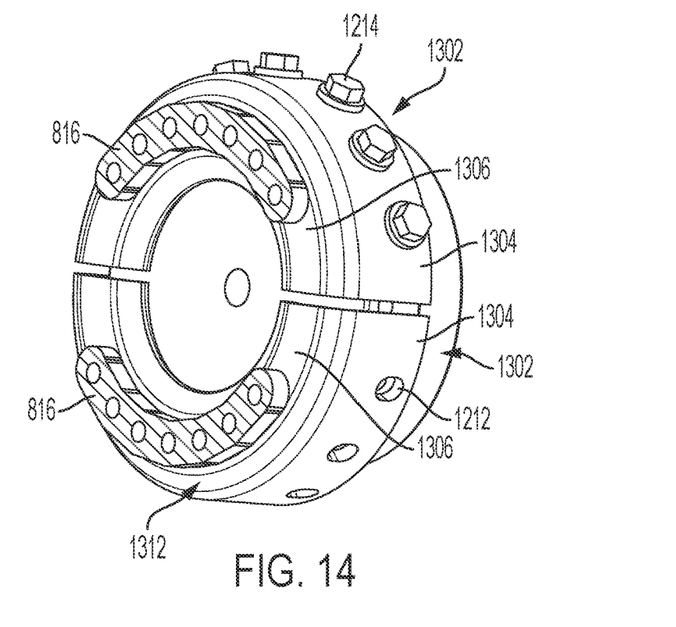
FIG. 14 is a partially disassembled view of the grid coupling of FIG. 12.
Figure 15:
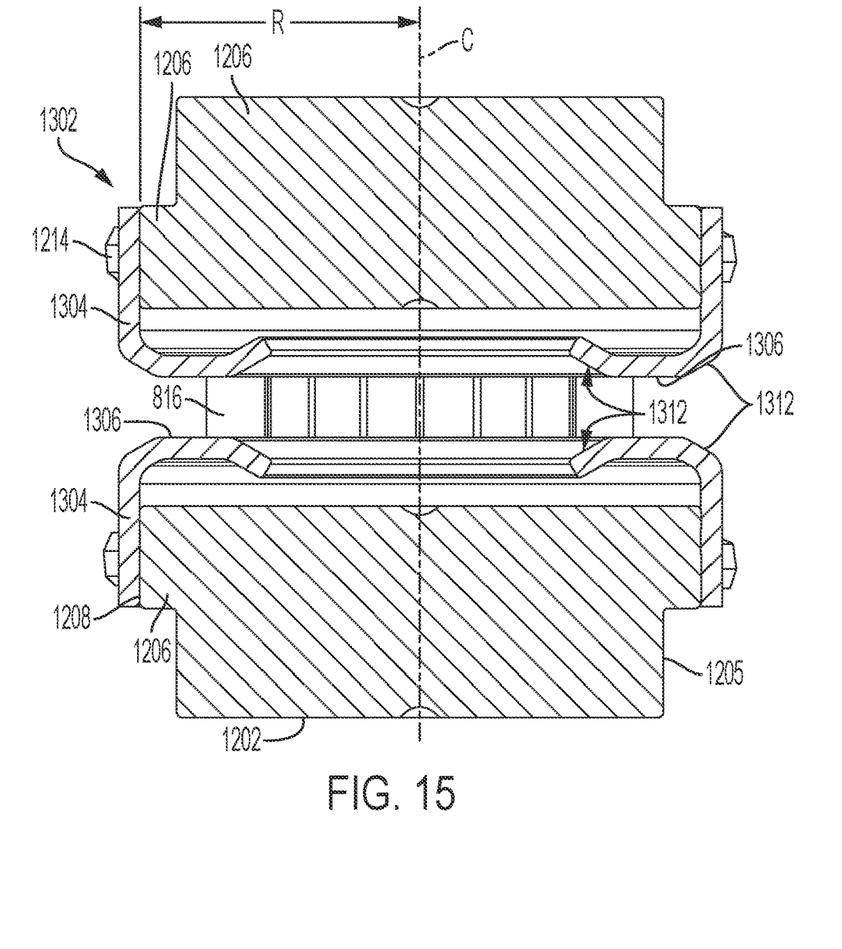
FIG. 15 is a sectional view of the grid coupling of FIG. 12.
Figure 16:
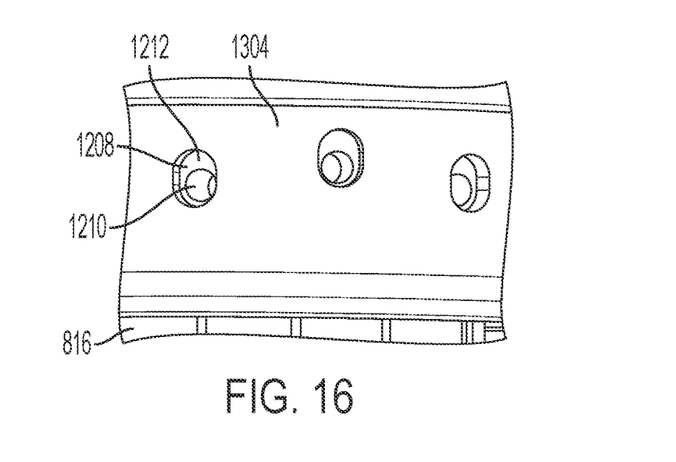
FIG. 16 is an enlarged detail view of a portion of the grid coupling of FIG. 12.

An additional alternative embodiment for a coupling 1200 is shown in FIG. 12 from an outline, side perspective, and in FIGS. 13, 14 and 15 from various cross sectioned perspectives. An enlarged, detail view of a portion of the coupling 1200 is shown in FIG. 16. In reference to these figures, the coupling 1200 is configured to installation on two shafts 1202 and 1204, each having a generally cylindrical shape and forming an outer cylindrical surface 1205. Each of the two shafts 1202 and 1204 includes an end flange 1206 having a generally flat shape with uniform thickness along an axial direction of a centerline, C, that extends by a radial distance, R, outwardly relative to the outer cylindrical surface 1205. Each end flange 1206 forms or defines a flange surface 1208 that extends for an axial length, L, along the centerline C, and has a cylindrical shape that is offset from the outer cylindrical surface 1205 of the shaft by the radial distance R in a radial direction that is perpendicular to the centerline C of each shaft segment. It is noted that the shafts 1202 and 1204 are shown aligned along the same centerline C, but in practice some degree of misalignment may be present that can be accommodated by the resilient nature of the resilient shoes 816.

A plurality of threaded openings 1210 are formed in the flange surface 1208 in a spaced apart fashion and extend in a radial direction towards the centerline C. The threaded openings 1210 align with openings 1212 and accommodate or threadably engage fasteners 1214 therein that extend through the openings 1212. The openings 1212, which are oversized for the fasteners 1214, are formed in mounting plates 1302 that are fastened to the end flanges 1206.

The mounting plates 1302, as shown in the FIGS. 13 and 14, have a generally semi-cylindrical, stepped cylinder shape that includes at least an outer cylindrical wall 1304 and an annular face 1306, which extends is generally perpendicular relative to the outer cylindrical wall 1304. In other words, the outer cylindrical wall 1304 extends in an axial direction along the centerline C at a radius, R, while the annular face 1306 extends in a radial direction, perpendicular to the centerline C and towards the centerline C. In the embodiment shown, the annular face 1306 forms through holes 1308 and threaded holes 1310 at the same radial distance from the centerline C and alternatingly spaced to accommodate fasteners (omitted for clarity), such as fasteners 814 (FIG. 9) that interconnect from alternatingly opposite axial directions two opposed annular faces 1306 and to sandwich therebetween two resilient shoes 816.

Conical surfaces 1312 creating a convex feature around the annular face 1306 are optionally formed in each mounting plate 1302. As shown, each mounting plate 1302 is generally semi-circular in axial cross section such that two mounting plates are used for each shaft (four total). A resilient shoe 816 is thus engaged between each pair of mounting plates 1302. Each mounting plate 1302 is engaged with the respective shaft using seven fasteners 1214 and is also connected to its opposing mounting plate 1302 using seven fasteners 814 (omitted for clarity) disposed in alternating axial orientations in a similar or identical fashion and described above for other coupling embodiments to maintain a uniform and balanced loading on the shafts. As can be seen in FIG. 16, the oversized openings 1212 have a generally elliptical shape that is larger than, and contains the threaded opening 1210 to permit misalignment between the shafts 1202 and 1204 during installation.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

What is claimed is:

1. A coupling for rotationally engaging a first shaft and a second shaft, the first and second shafts having free ends disposed in spaced relation to one another, the coupling comprising:
   a first annular flange adapted to be engaged on a free end of the first shaft;
   a second annular flange adapted to be engaged on a free end of the second shaft, wherein the second annular flange is disposed generally aligned in an axial direction with the first annular flange along a centerline axis, and in spaced relation to the first annular flange across a gap;
   at least one resilient element disposed in the gap in abutting relation to the first and second annular flanges;
   a first plurality of fasteners extending from the first annular flange, through the at least one resilient element, to the second annular flange;
   a second plurality of fasteners extending from the second annular flange, through the at least one resilient element, to the first annular flange; and
   a plurality of mounting plates having a stepped cylindrical shape that includes at least an outer cylindrical wall and an annular face, the plurality of mounting plates extending peripherally around each of the free ends of the first and second shafts, wherein the at least one outer cylindrical wall includes through-openings accommodating fasteners engaged with the plurality of threaded openings to connect the plurality of mounting plates to the first and second shafts,
   wherein fasteners of the first plurality of fasteners are disposed in alternating fashion with fasteners of the second plurality of fasteners,
   wherein each free end of the first and second shafts forms an end flange that has a generally flat shape with uniform thickness in the axial direction that defines a flange surface having a cylindrical shape, and
   wherein each flange surface includes a plurality of threaded openings that are spaced apart and extend in a radial direction towards the centerline axis.

2. The coupling of claim 1, wherein each of the free end of the first shaft and the free end of the second shaft forms splines in a radially outer portion thereof, and wherein each of the first annular flange and the second annular flange forms teeth along an inner portion thereof that are adapted to mesh with the splines.

3. The coupling of claim 1, wherein each of the first annular flange and the second annular flange includes a thru-flange portion connected, respectively, to a stop flange portion, wherein each respective stop flange portion includes a stop wall adapted to limit axial motion of the first or second annular flange in the axial direction.

4. The coupling of claim 1, further comprising a second resilient element disposed in the gap at a diametrically opposite location relative to the at least one resilient element, wherein each of the at least one and second resilient elements extends peripherally around a segment of an entire periphery of the first and second annular flanges.

5. The coupling of claim 1, wherein the first annular flange is connected to a first collar, the first collar having a generally hollow cylindrical shape that is adapted to engage the free end of the first shaft, and wherein the second annular flange is connected to a second collar, the second collar having a generally hollow cylindrical shape that is adapted to engage the free end of the second shaft.

6. The coupling of claim 1, wherein the at least one resilient element is made from a composite structure that includes a resilient material that is molded over rigid structural elements.

7. The coupling of claim 1, wherein the annular faces of the plurality of mounting plates together define the first and second annular flanges.

8. The coupling of claim 1, wherein the plurality of mounting plates consists of four mounting plates, each of the four mounting plates having a semi-cylindrical shape.

9. The coupling of claim 1, wherein each of the through-openings has an enlarged shape relative to the fasteners engaged with the plurality of threaded openings in the flange surfaces.

10. The coupling of claim 1, wherein the first annular flange includes a plurality of through-openings that accommodates the first plurality of fasteners, each of the plurality of through-openings being configured to apply a tangential force onto head portions of the first plurality of fasteners when the at least one resilient element is unable to support a clamping load applied by the first plurality of fasteners between the first and second annular flanges.

11. A coupling assembly, comprising:
   a first shaft having a free end and a rotation axis;
   a second shaft having a free end, the second shaft disposed generally along the rotation axis such that the free end of the second shaft is disposed at an axial gap along the rotation axis relative to the free end of the first shaft;

a first annular flange engaged on the free end of the first shaft;

a second annular flange engaged on the free end of the second shaft in opposed relation with the first annular flange across the axial gap;

at least one resilient element disposed in the axial gap in abutting relation to the first and second annular flanges;

a first plurality of fasteners extending from the first annular flange, through the at least one resilient element, to the second annular flange;

a second plurality of fasteners extending from the second annular flange, through the at least one resilient element, to the first annular flange; and a plurality of mounting plates having a stepped cylindrical shape that includes at least an outer cylindrical wall and an annular face, the plurality of mounting plates extending peripherally around each of the free ends of the first and second shafts, wherein fasteners of the first plurality of fasteners are disposed in alternating fashion with fasteners of the second plurality of fasteners, wherein each free end of the first and second shafts forms an end flange that has a generally flat shape with uniform thickness in the axial direction that defines a flange surface having a cylindrical shape, wherein each flange surface includes a plurality of threaded openings that are spaced apart and extend in a radial direction towards a centerline, and wherein the at least one outer cylindrical wall includes through-openings accommodating fasteners engaged with the plurality of threaded openings to connect the plurality of mounting plates to the first and second shafts.

12. The coupling assembly of claim 11, wherein each of the free end of the first shaft and the free end of the second shaft forms splines in a radially outer portion thereof, and wherein each of the first annular flange and the second annular flange forms teeth along an inner portion thereof that are adapted to mesh with the splines.

13. The coupling assembly of claim 11, wherein each of the first annular flange and the second annular flange includes a thru-flange portion connected, respectively, to a stop flange portion, wherein each respective stop flange portion includes a stop wall adapted to limit axial motion of the first or second annular flange in the axial direction.

14. The coupling assembly of claim 11, wherein the first annular flange is connected to a first collar, the first collar having a generally hollow cylindrical shape that is adapted to engage the free end of the first shaft, and wherein the second annular flange is connected to a second collar, the second collar having a generally hollow cylindrical shape that is adapted to engage the free end of the second shaft.

15. The coupling assembly of claim 11, wherein the annular faces of the plurality of mounting plates together define the first and second annular flanges.

16. The coupling assembly of claim 11, wherein the plurality of mounting plates consists of four mounting plates, each of the four mounting plates having a semi-cylindrical shape.

17. The coupling assembly of claim 11, wherein the first annular flange includes a plurality of through-openings that accommodates the first plurality of fasteners, each of the plurality of through-openings being configured to apply a tangential force onto head portions of the first plurality of fasteners when the at least one resilient element is unable to support a clamping load applied by the first plurality of fasteners between the first and second annular flanges.

* * * * *